June 8, 1937.  E. F. TANNEWITZ  2,083,353
GLASS RUN FOR SLIDABLE WINDOWS
Filed June 17, 1936
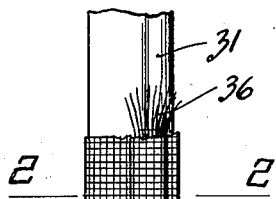
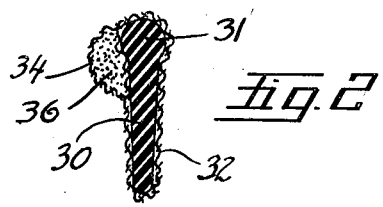
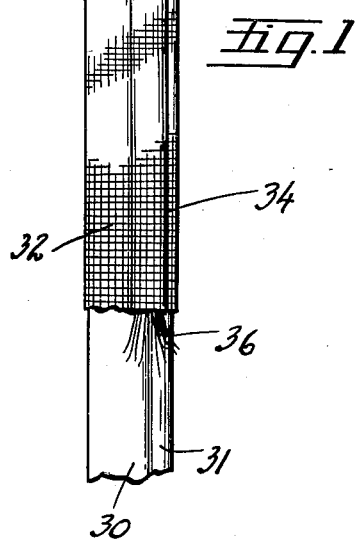
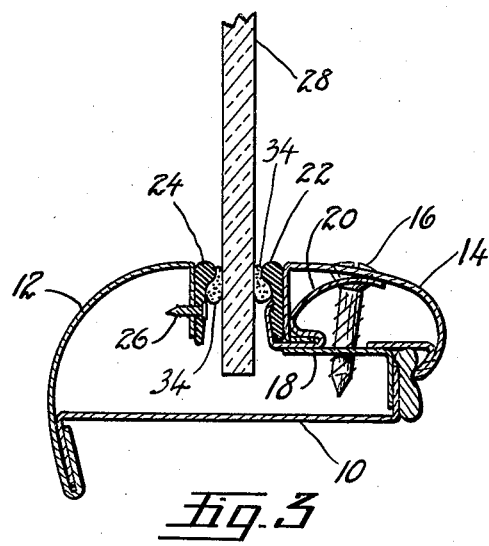
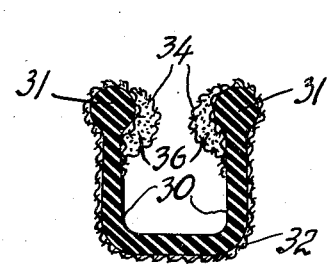
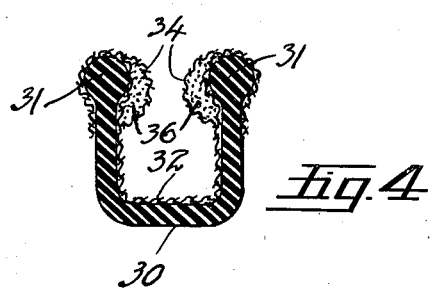
INVENTOR.
Edward F. Tannewitz
BY
Parker & Burton
ATTORNEYS.

Patented June 8, 1937

2,083,353

UNITED STATES PATENT OFFICE 2,083,353

GLASS RUN FOR SLIDABLE WINDOWS

Edward F. Tannewitz, Detroit, Mich., assignor to Detroit Gasket and Manufacturing Company, Detroit, Mich., a corporation of Michigan Application June 17, 1936, Serial No. 85,749

4 Claims. (Cl. 296—44.5)

This invention relates to improvements in glass runs for slidable window panes such as the slidable glass panes employed in automobile closed bodies and it relates to an improved glass cushioning covering for the glass run body.

Glass runs of this character are provided in channel form or in the form of a pair of side wall strips adapted to be secured in place within the rabbet of a window frame to support the glass pane for slidable movement. Whether in channel form or in the form of a pair of side wall strips the glass run serves to support and cushion the slidable glass pane as it is raised and lowered.

This improvement is applicable to a glass run whether of the channel or strip type. It comprises a glass run wherein the side wall element is provided with a suitable finish covering which includes as a part of the covering material itself a cushion like bead portion disposed to directly contact the slidable glass pane to cushion the same and to facilitate its slidable movement.

A common type of glass run covering material employed is a woven fabric which is preferably formed in a web width. This web width is folded and adhesively secured about the body of a suitable glass run. Assuming that the glass run body is of channel form this outer covering may extend completely over the exposed surface or it may cover merely the glass engaging surfaces and the outer exposed bead portion or it may cover the outer surface of the side walls and extend completely over the inner surface of the channel. The particular disposition and adhesive securement of the covering material with respect to the body of the glass run may be varied as desired.

The web of covering material is provided with a soft deformable bead like portion which constitutes a part of the covering material itself and which extends longitudinally of the web. If the web is a woven fabric this cushion-like bead portion is woven into the covering material during the fabrication thereof. The web of covering material is so wrapped about the body of the glass run that this bead portion is properly disposed to directly contact the slidable glass pane supported by the run.

Preferably the glass run body is itself provided with a bead portion extending along its outer longitudinal margin. This is rather conventional practice. The covering material is so wrapped about the body of the run that the cushion like bead portion of the covering material is disposed to project inwardly from the side wall of the glass run body adjacent to or slightly below the outer marginal bead of the glass run body. The cushion like bead portion of the covering material is soft and compressible to a substantially greater degree than the run body itself. It forms a peculiarly effective support for the slidable glass pane.

Other objects, advantages, and meritorious characteristics of this invention will more fully appear from the following description, appended claims, and accompanying drawing, wherein:

Figure 1 is an elevation partly broken away of one embodiment of my improvement, Fig. 2 is a cross sectional view through the structure shown in Fig. 1, Fig. 3 is a cross sectional view through an automobile pillar assembly showing my improved glass run in position, Fig. 4 is a cross sectional view through a channel shaped glass run embodying my invention, and Fig. 5 is a view taken on the same line as Fig. 4 showing a modified construction.

My improvement is illustrated as applied to glass runs of the channel form as shown in Figs. 4 and 5 and to glass runs of the side wall strip type as shown in Figs. 2 and 3. Fig. 3 illustrates one well known type of pillar assembly wherein glass runs of the strip type are employed. Obviously other types of pillar assemblies might be employed.

In the construction shown in Fig. 3 the pillar member is indicated as 10. The outer moulding is shown as 12. A finish strip 14 is secured by screws 16 or the like to a retainer element 18 itself secured to the pillar 10. A clamping strip 20 holds the inner glass run strip 22 in place. The outer glass run strip 24 may be secured in position by screws 26 or the like. The slidable pane 28 is disposed between the two glass run strips for slidable movement. In this assembly the pane has permitted lateral movement between the two strips 22 and 24 as shown.

The type of glass run shown in Fig. 3 is that illustrated in Fig. 2 in section. There is a body portion 30 which may be of rubber or other suitable material. A suitable protective and finish covering 32 is secured to this body portion. This covering may extend completely about the body member as shown or only over the glass engaging surface thereof. This covering material may be of fabric or any other suitable material. Woven fabric may be used as shown in Fig. 1.

This covering material embodies a bead 34 formed as a part of the covering material itself. This bead 34 is soft and cushion like. It is composed of a soft core 36 enclosed within a sheath made up of the material of which the covering itself is formed. This core 36 may be made up as here illustrated of a multiplicity of soft fibrous strands bundled together and held in bead shape by the woven fabric as shown. The bead extends longitudinally of the glass run. Preferably it is disposed slightly below or adjacent to the outer margin of the glass run. One position of the bead on a side wall glass run strip is shown in Fig. 2. Its position in a channel strip is shown in Figs. 4 and 5. Under pressure of the glass pane the bead is deformed or flattened out as illustrated in Fig. 3.

The glass run body 30 of Fig. 2 is itself provided with a bead like outer margin 31 and the bead 34 extends inwardly thereof offset slightly below the same. This bead portion 31 of the body is itself of soft material but does not possess the cushioning properties of the bead 34 of the covering material. In Figs. 4 and 5 the channel body 30, which may, like the body of the structure of Fig. 2, be formed of rubber, is provided along each outer margin with a bead 31. The bead 34 of the covering material is arranged as shown adjacent thereto so as to take the thrust of the glass pane.

The body portion 30 whether of channel or side wall strip form may be of any suitable material. Rubber is mentioned merely as a suitable material. Such body may be made up or reinforced as desired.

What I claim:

1. In combination with a window frame having a rabbet adapted to receive a glass pane for slidable movement, a glass run mounted within the rabbet and comprising a side wall having a body portion formed of cushioning material and provided with a bead extending along its outer margin and a covering of finish material over the inner surface of said side wall, said covering of finish material embodying a cushion like bead portion formed therein extending longitudinally of the side wall and projecting interiorly therefrom overlying and slightly below the outer marginal bead portion thereof.

2. In combination with a window frame having a rabbet adapted to receive a glass pane for slidable movement, a glass run mounted within the rabbet and comprising a side wall having a body portion formed of cushioning material, a covering of finish material extending over the inner surface of said side wall body portion, said covering embodying a cushion-like bead portion formed therein extending longitudinally of the side wall and projecting interiorly therefrom and being more readily deformable than the cushion body portion.

3. In combination, a window frame, a slidable glass pane, a glass run carried by the frame supporting the pane for slidable movement, said glass run comprising a side wall body portion formed of rubber and provided along its outer longitudinal margin with a cushion bead and a finish covering extending over the glass engaging surface of said body portion, said covering provided with a cushion like bead portion interposed between the outer surface of the covering material and said body portion and overlying the cushion bead of the body portion and adapted to be deformed therebelow.

4. In combination, a window frame, a slidable glass pane, a glass run carried by the frame supporting the pane for slidable movement, said glass run comprising a side wall body portion formed of rubber and provided along its outer longitudinal margin with a cushion bead and a finish covering extending over the glass engaging surface of said body portion, said covering provided with a cushion like bead portion arcuate shaped to overlie the interior portion of the body side wall bead and adapted under pressure of the glass pane to be deformed against the side wall below the bead portion of the side wall.

EDWARD F. TANNEWITZ.